United States Patent Office 3,423,441
Patented Jan. 21, 1969

3,423,441
PROCESS FOR PREPARATION OF IODINATED
LECITHIN
Kazuo Makabe, Kanagawa-ken, Japan, assignor to Daiichi
Yakuhin Sangyo Kabushiki Kaisha, Tokyo-to, Japan, a
company of Japan
No Drawing. Filed June 28, 1966, Ser. No. 561,000
Claims priority, application Japan, July 24, 1965,
40/44,457
U.S. Cl. 260—403        11 Claims
Int. Cl. C11c 3/00

ABSTRACT OF THE DISCLOSURE

Iodinated lecithin is prepared by adding iodine and coarse particles of at least one of the metals magnesium, zinc, aluminum, titanium, manganese, nickel, cobalt, cadmium and copper to lecithin dissolved in glacial acetic acid and heating the resultant mixture with stirring. The product is useful as an iodine-containing medical preparation.

The present invention relates to a process for the preparation of iodinated lecithin, wherein iodine and coarse particles of at least one of the metals, magnesium, zinc, aluminum, manganese, nickel, cobalt, cadmium and copper, are added to lecithin dissolved in glacial acetic acid and heated with stirring. The purpose of this invention is to provide iodine-containing medical preparations which are stable and non-hydroscopic. They can thus be preserved for a long period of time and will cause no harmful side-effect due to iodine or intestinal disturbance.

The characteristic feature and advantages of the present invention will become clear from the following description.

Although the combination of unsaturated fats or fatty acids with iodine is relatively easy and has been well known for a long time, it is not easy to combine lecithin with iodine at the present time; thus the iodine chloride method and the periodide method are known. However the iodine chloride method has the disadvantages that the catalyst used is difficult to prepare and that iodinated-chlorinated lecithin may possibly be formed as a by-product. On the other hand, the periodide method has a defect in that, when chloroform or carbon tetrachloride is used as solvent, the solvent is oxidized by iodine so as to generate phosgene and produce chlorine, resulting in replacement of iodine of the generated iodinated lecithin by the chlorine to generate chlorinated lecithin or iodinated-chlorinated lecithin. Hence these methods necessitate the separation of iodinated lecithin from these by-products, pure iodinated lecithin being obtained only with difficulty.

The present invention provides a process for the ready preparation of pure iodinated lecithin without the above-mentioned defects by dissolving lecithin in glacial acetic acid and stirring the resulting solution with iodine and coarse metallic particles while being heated.

In the method according to the present invention, wherein coarse particles of metals such as magnesium, zinc, aluminum, titanium, manganese, nickel, cobalt, cadmium, copper, etc. is used as a catalyst soybean lecithin which is completely exoleated by acetone, is caused to react in glacial acetic acid solution with iodine while being heated and stirred. After having been cooled, the solution is filtered to remove the catalyst and ascorbic acid is added so as to remove non-reacted iodine. Approximately one half of the glacial acetic acid is distilled off, the solution is then diluted with water, and then an immiscible organic solvent such as trichloroethylene, chloroform or carbon tetrachloride may be added to the solution in order to extract iodinated lecithin, the water layer being separated. To the organic layer, after washing, is added anhydrous sodium sulfate. This is left until it is dehydrated and then the organic layer may be filtered and the solvent distilled off to obtain crude iodinated lecithin as a soft mass. By removing non-reacted lecithin with cold absolute alcohol, pure iodinated lecithin is obtained as a brown powder.

According to the method of the present invention, not only is a difficult process for providing a catalyst eliminated but also the reaction requires a short period of time. Furthermore, unlike the conventional method, there is no possibility that the solvent which is used in the process may be oxidized by iodine to generate chlorine which replaces the iodine combined with lecithin to form iodinated-chlorinated lecithin. Besides, since a greater amount of iodine is combined with lecithin, treatment after the reaction is made easy.

Furthermore, in the present invention, non-reacted iodine can be easily removed, by using ascorbic acid, without introducing impurities.

Ascorbic acid applied in this case is free of the disadvantage encountered when sodium hyposulphite is used, to remove free iodine that the product may be contaminated by sulphur resulting from the decomposition of sodium hyposulphite. The iodine content of the product differs according to the amount of iodine added, but usually it is quite easy to combine approximately 20% of iodine with lecithin. The appropriate volume of coarse particles of metal to be used in the process is about 10%. This is, however, properly controlled depending upon the reaction conditions such as the amount of the solvent, the speed of reaction, the temperature at which reaction takes place, and so forth.

The following examples are illustrative of the present invention:

EXAMPLE 1

100 g. of soybean lecithin that had been completely exoleated and dried by means of acetone was dissolved in 1,000 ml. of glacial acetic acid, and there was added about 10 g. of coarse particles of metallic magnesium as catalyst and 20 g. of iodine. The solution was stirred and heated at 90° C. for approximately fifteen hours and then, after having been cooled and filtered, a small amount of ascorbic acid was added to the solution in order to remove the non-reacted iodine. Then, after a half of the glacial acetic acid had been distilled off, the solution was diluted with water and extracted by trichloroethylene. To the resulting solution, after being well washed, was added anhydrous sodium sulfate and it was allowed to stand until dehydrated, when it was filtered. When the trichloroethylene was distilled off, 115 g. of crude iodinated lecithin was obtained as a light brown soft mass. By washing the thus obtained mass with absolute alcohol, 105 g. of refined iodinated lecithin was obtained.

EXAMPLE 2

100 g. of soybean lecithin treated as in Example 1 were dissolved in 1,000 ml. of glacial acetic acid and 15 g. of sand-like metallic zinc as catalyst and 30 g. of iodine were added. The resulting mixture was stirred and heated at 90° C. for 20 hours. After cooling and filtering, there was added to the reaction mixture a small amount of ascorbic acid for removing free iodine. After one half of the glacial acetic acid was distilled off, it was diluted with water and the product was extracted with carbon tetrachloride. The resulting solution was well washed and anhydrous sodium sulfate was added to dehydrate it. When dehydration had been completed, the solution was filtered.

In the next stage by distilling off the carbon tetrachloride, 120 g. of crude iodinated lecithin, light brown and of soft mass, was obtained. By washing this with cold absolute alcohol, 110 g. of refined iodinated lecithin was obtained. Analyses of the products of Examples 1 and 2 were carried out as follows:

Test for the presence of free iodine:

The product was dissolved in ether and tested by the potassium iodide-starch reagent but there was no free iodine present.

Test for ascertaining the presence of chlorized lecithin or iodinated-chlorinated lecithin:

The product was hydrolyzed by alcoholic sodium hydroxide and after having been cooled and acidified by nitric acid, it was cooled and filtered. Silver nitrate was added, and the precipitate which resulted was reacted with ammonia water. The resulting material was filtered and the filtrate was acidified with nitric acid. No white turbidity was generated.

Therefore it is clear that the product of both of Examples 1 and 2 contains no said chloride.

Identification of lecithin:

The product according to Examples 1 or 2 was boiled together with glacial acetic acid and zinc powder so as to combine iodine with the zinc to make zinc iodide, and alcoholic cadmium chloride was added to this to react with the lecithin reaction. As a result, an insoluble double salt was generated and thus it was proved that there took place no change in the lecithin.

Test for iodine content:

To the product was added alcoholic sodium hydroxide solution and it was boiled to effect hydrolysis, the alcohol being distilled off after the iodine of the iodized lecithin has been converted into sodium iodide. The solution was cooled and acidified with hydrochloric acid. It was tightly plugged and left standing for some time for cooling. The solution was filtered and the filtrate was analyzed by a normal solution of potassium iodate.

The iodine contents were as follows:

|  | Percent |
|---|---|
| Product of Example 1 | 15.8 |
| Product of Example 2 | 18.5 |

What I claim is:

1. A process for the preparation of iodinated lecithin comprising adding 20 to 30 weight percent iodine based on the weight of lecithin, and 10 to 15 weight percent, based on the weight of lecithin, coarse particles of at least one metal selected from the group consisting of magnesium, zinc, aluminum, titanium, manganese, nickel, cobalt, cadmium, and copper to lecithin dissolved in glacial acetic acid and heating the resultant mixture with stirring at about 90° C.

2. The process of claim 1 in which the metal is magnesium.
3. The process of claim 1 in which the metal is zinc.
4. The process of claim 1 in which the metal is aluminum.
5. The process of claim 1 in which the metal is titanium.
6. The process of claim 1 in which the metal is manganese.
7. The process of claim 1 in which the metal is nickel.
8. The process of claim 1 in which the metal is cobalt.
9. The process of claim 1 in which the metal is cadmium.
10. The process of claim 1 in which the metal is copper.
11. The process of claim 1 in which ascorbic acid is used to remove non-reacted iodine from the reaction mixture.

References Cited

UNITED STATES PATENTS

| 982,656 | 1/1911 | Arnaud et al. | 260—408 |
| 3,072,689 | 1/1963 | Hayashi | 260—403 |

ALEX MAZEL, *Primary Examiner.*

R. V. RUSH, *Assistant Examiner.*